No. 864,902. PATENTED SEPT. 3, 1907.
T. C. MOORE.
LIFTING AND CARRYING TRUCK.
APPLICATION FILED DEC. 31, 1906.
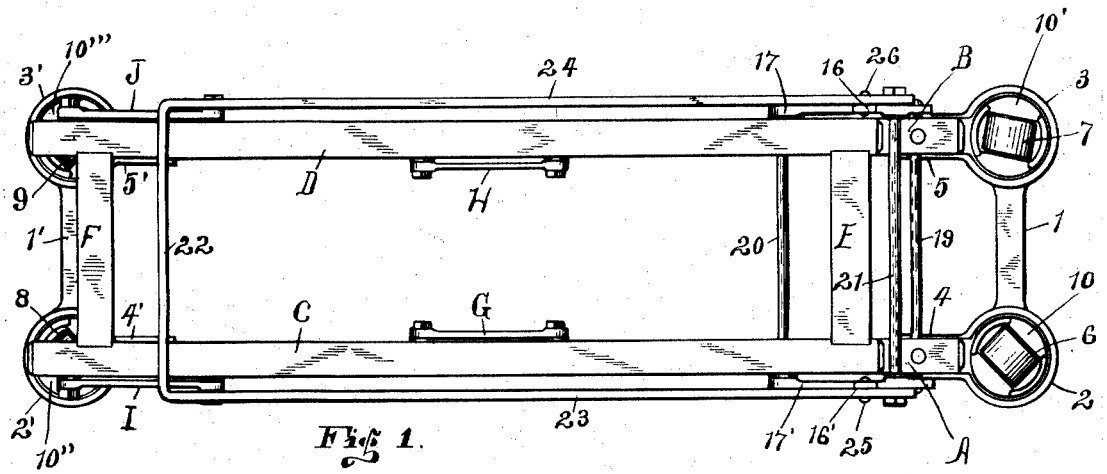
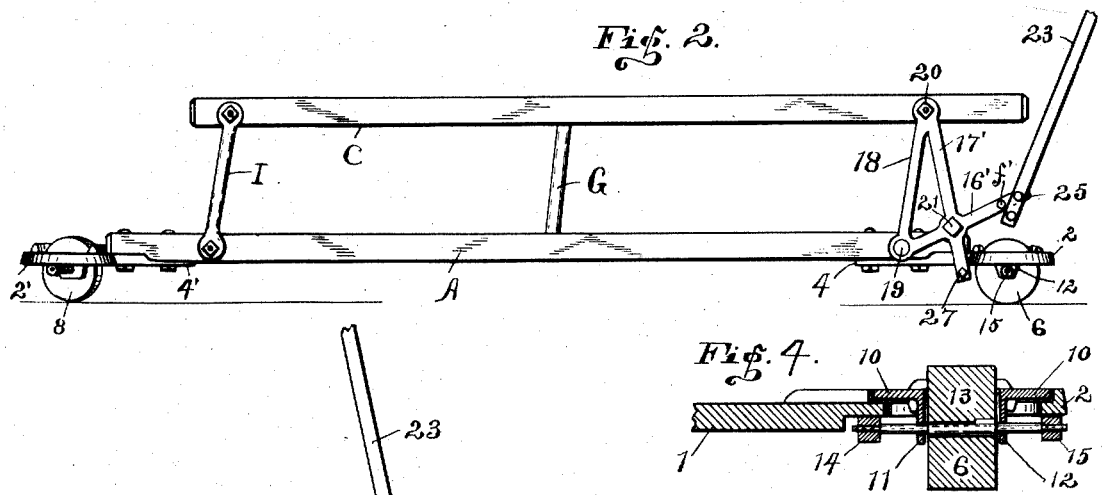
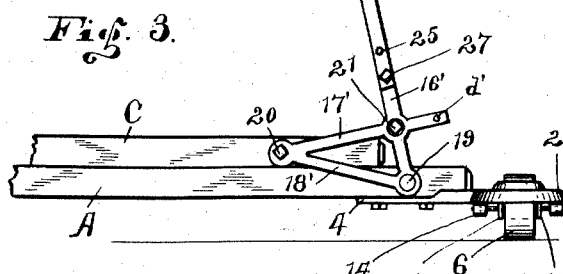
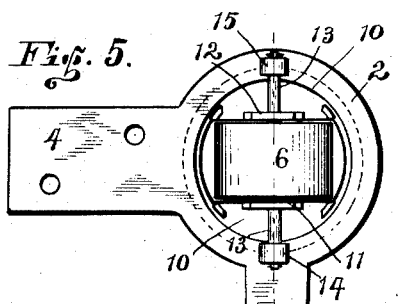
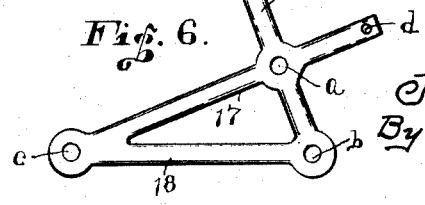
Witnesses:
Adelaide Kearns.
R. G. Randle.
Inventor;
Thomas C. Moore,
By Robert W. Randle,
his Attorney.

UNITED STATES PATENT OFFICE.

THOMAS C. MOORE, OF DUBLIN, INDIANA.

LIFTING AND CARRYING TRUCK.

No. 864,902.

Specification of Letters Patent.

Patented Sept. 3, 1907.

Application filed December 31, 1906. Serial No. 350,213.

*To all whom it may concern:*

Be it known that I, THOMAS C. MOORE, a citizen of the United States, residing in Dublin, in the county of Wayne and State of Indiana, have invented a new and useful Lifting and Carrying Truck, of which the following is a full and accurate specification, being such as will enable others skilled in the art to which it relates to make and use the same.

My present invention relates to a lifting and carrying truck comprising in combination two independent frames, one of which is mounted on carrying wheels, and the other being pivoted mounted above and to the former whereby it may be moved up and down, and including means for accomplishing said movements.

The object of my invention, broadly stated, is to provide a hand-truck which will be neat and attractive in appearance, strong and durable in construction, easily operated and controlled, and which can be manufactured and sold at a comparatively low price.

More specifically, my object is to provide a truck intended especially for lifting and moving stoves or the like, which may easily be placed under a stove, without its resting on the usual stove-board, by which the stove may be lifted sufficient to clear the floor and then be moved while on the truck to a new position thereby, to provide wheels for said truck which will not damage a floor or the floor covering, to provide means for swivelally mounting said wheels whereby the truck may be turned and moved in any direction, and to provide means for securing the truck, and its load, in an elevated position.

Other particular objects and advantages will present themselves in the course of the ensuing specification, and the parts and the combinations which are new will be pointed out in the appended claims.

The preferred manner of the construction of my invention, and that which in practice has been found to be the most practical, is shown most clearly in the accompanying drawing, forming a part of this specification, in which—

Figure 1 shows a top plan view of the truck as closed or folded for packing or storage. Fig. 2 shows a side elevation of the invention elevated, that is to say,—
distended, in the position it would assume when carrying a load. Fig. 3 is a fragmentary view of the invention closed, being the position it would be in when being placed under a stove or the like. Fig. 4 is a detail cross sectional view taken centrally through one of the supporting wheels or casters. Fig. 5 is a detail view of the underside of one of the caster frames. And Fig. 6 is a detail view of one of the bell-cranks.

Similar indices denote like parts throughout the several views of the drawings.

In order that the construction and operation of my invention may be the more fully understood I will now take up a detail exposition thereof, in which I will describe the various parts and their operations as briefly and as compactly as I may.

The letters A and B denote the two side-bars of the lower or base frame same being located some distance apart and connected at their end portions as will presently be disclosed. The front ends of the bars A and B are connected by a metal bar 1, carrying on its ends the ring members 2 and 3, said rings having each a securing plate, 4 and 5 respectively, extending back therefrom at right angles to the bar 1. The ends of the side bars A and B rest on said plates 4 and 5, respectively, and they are secured thereto by bolts substantially as shown. Said bar 1, the rings 2 and 3, and the plates 4 and 5 are formed integral with each other. The rear ends of the bars A and B are secured together in same manner, by similar members indicated by like numerals primed.

The numerals 6, 7, 8 and 9 designate the four caster wheels, which are each mounted substantially alike, the former being shown in detail in Figs. 4 and 5, therefore I will describe the mounting of the wheel 6, and like parts of the other wheels, where shown, will be denoted by like numerals primed in progressive succession.

Numeral 10 designates a round plate having an opening therethrough only slightly larger than is the diameter of the wheel 6. Said plate 10 is revolubly mounted in the upper face of the ring 2. Located centrally and on each side of said aperture of the plate 10, and projecting down through and beyond the ring 2, are the two hangers 11 and 12. Revolubly mounted in said lugs 11 and 12, and extending out at each end to near the periphery of the ring 2, is the shaft 13. Mounted on the shaft 13, and located between said hangers 11 and 12, is the wheel 6, above referred to. Revolubly mounted on each end of the shaft 13 are the rollers 14 and 15, which are adapted to roll on the under face of the ring 2, their diameters being such as to prevent the plate 10 from having frictional contact with the ring 2. By the above it is apparent that I provide four comparatively large swivelally mounted carrying wheels, yet admitting of the frame being comparatively near the floor line as shown.

The upper frame consists of the two side-bars, C and D, spaced apart the same distance as are the bars A and B, and secured together by the respective front and rear cross-bars E and F.

The bars A and C are pivotedly connected together near their centers by the link G, and in like manner the bars B and D are connected by the link H. The bars A and C are connected near their rear ends by the link I, while in like manner the bars B and D are connected by the link J. From the above it will be notably apparent that I have the two frames pivotedly connected whereby they may be moved towards or from each other yet at all times remaining parallel with each other. Near their forward ends the two frames are again connected on each side by bell-cranks, each bell-crank being formed in the shape of a figure 4, as shown in Fig. 6. Said bell-crank members being identical with each other I will describe and refer to the parts of one by certain characters, denoting the other, where appearing, by similar characters primed.

Referring to the bell-crank located on the farther side of the truck, it will be observed, as shown in Fig. 6, that it is composed of three members: 16, 17 and 18, which are integrally united together. At the crossing of the members 16 and 17 there is formed an aperture $a$. At the juncture of the members 16 and 18 is an aperture $b$. At the juncture of the members 17 and 18 is an aperture $c$. In the outer end of the member 17 is an aperture $d$. And in the outer end portion of the member 16 are two apertures, $e$ and $f$. Apertures like unto the above are formed in the bell-crank on the opposite side of the truck. As will be noticed, the members 18 of the bell-cranks are the same length, and for same purpose, as are the links above referred to.

The numeral 19 denotes a bolt, or the like, which passes through and between the forward ends of the bars A and B, passing through the eyes $b$ of the bell-cranks, by which the bell-cranks are pivotedly mounted to the outer faces of said bars A and B. In like manner the numeral 20 denotes a bolt, or the like, passing through and extending between the forward portions of the bars C and D, passing through the eyes $c$ of the bell-cranks, by which said bell-cranks are pivotedly mounted to the outer faces of said bars C and D. Also connecting the two bell-cranks is a third bolt, or the like, designated by the numeral 21, this latter bolt does not pass through any other parts other than said bell-cranks as shown, extending through therebetween and secured in apertures $a$ thereof.

The numeral 22 denotes the handle, having the arms 23 and 24 extending parallel with each other at right angles thereto. Said parts 22, 23 and 24 being formed integral with each other, and formed, preferably, of a flat metal bar. In each of the free ends of the arms of said handle are formed two apertures, corresponding with said apertures $e$ and $f$ of the bell-cranks. The arms of the handle are pivotedly connected to the bell-cranks by rivets or the like, which pass through the inner apertures of the arms of the handle and through the outer apertures, $e$, of the member 16 of the bell-cranks. Said rivets are designated by the numerals 25 and 26.

The numeral 27 designates a rod or bolt to be employed for two purposes: It may be passed through both of the outer apertures of the arms of the handle and through the apertures $f$ of the members 16 of the bell-cranks, as shown in Fig. 3, by which the handle arms are rigidly connected to the bell-cranks; or, after the upper frame of the truck has been raised, as in Fig. 2, said rod 27 may be passed through the apertures $d$ of the members of the bell-cranks, passing said rod underneath the members A and B, thereby locking the upper frame of the truck in the position shown in Fig. 2.

The operation of my truck is extremely simple, for instance: when in the position shown in Fig. 1 the truck may be placed in a comparatively small space. Desiring to use the truck it is placed with the four caster wheels on the floor, the handle is then raised up parallel with the members 16—16', as in Fig. 3, placing the rod 27 as just described, and as shown in Fig. 3. The rear end of the truck may then be run under a stove, allowing the wheels 8—9 and 6—7 to be on opposite sides of the stove-board. Then by pulling the handle of the truck forward it will be seen that the upper frame of the truck will be elevated, allowing the links to pass slightly beyond the perpendicular as in Fig. 2, at which point the bolt 21 will rest on the forward ends of the members A and B. The rod 27 is now removed from the arms of handle and placed through the apertures $d$ of the bell-crank, as shown in Fig. 2, thereby preventing the upper frame from turning back to its former position, and at same time allowing the handle to be moved up and down in operating the movements of the truck over the floor.

Having now fully shown and described my invention, what I claim and desire to secure by Letters Patent of the United States, is—

1. A lifting and carrying truck comprising in combination, two frames of equal width, links for connecting said frames in the rear and center, a pair of bell-cranks for connecting the frames in the front, a handle having arms pivotally mounted to said bell-cranks, means for rigidly connecting said arms to the bell-cranks, means for locking the upper frame after it has been raised, and carrying wheels mounted to the corners of the lower frame, all substantially as shown and described.

2. A lifting and carrying truck comprising in combination an upper and a lower frame, links for connecting the frames whereby the upper frame may be raised and lowered without moving the lower frame, a pair of bell-cranks for operating the upper frame, a handle for actuating said bell-cranks to provide means for propelling the truck, ties connecting the side members of the lower frame at its ends, a ring formed integral with each end of each of said ties, a plate revolubly mounted in said ring, an axle carried by each of said plates, a wheel mounted on said axle, and rollers mounted on the outer ends of said axles and adapted to travel around on the under face of said ring, all substantially as shown and described.

In testimony whereof I have hereunto signed my name to this specification in the presence of two subscribing witnesses.

THOMAS C. MOORE.

Witnesses:
LIZZIE MOORE,
ROBERT W. RANDLE.